(12) United States Patent
Li (10) Patent No.: US 10,369,847 B2
(45) Date of Patent: Aug. 6, 2019

(54) HEAVY DUTY TIRE

(71) Applicant: Sumitomo Rubber Industries, Ltd., Kobe-shi, Hyogo (JP)

(72) Inventor: Qingmao Li, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 311 days.

(21) Appl. No.: 15/228,422

(22) Filed: Aug. 4, 2016

(65) Prior Publication Data

US 2017/0057298 A1  Mar. 2, 2017

(30) Foreign Application Priority Data

Aug. 26, 2015 (JP) ................................. 2015-167041

(51) Int. Cl.
*B60C 11/12* (2006.01)
*B60C 11/03* (2006.01)
(Continued)

(52) U.S. Cl.
CPC ...... *B60C 11/1236* (2013.01); *B60C 11/0306* (2013.01); *B60C 11/04* (2013.01); *B60C 11/047* (2013.01); *B60C 11/1259* (2013.01); *B60C 11/1272* (2013.01); *B60C 2011/036* (2013.01); *B60C 2011/0341* (2013.01); *B60C 2011/0351* (2013.01); *B60C 2011/0362* (2013.01); *B60C 2011/0367* (2013.01);
(Continued)

(58) Field of Classification Search
CPC ... B60C 11/04; B60C 11/042; B60C 11/1369; B60C 2011/0362; B60C 11/1236
See application file for complete search history.

(56) References Cited

U.S. PATENT DOCUMENTS 4,078,596 A * 3/1978 Nakayama .......... B60C 11/0306
                                                152/209.22
4,566,514 A * 1/1986 Mauk ..................... B60C 11/12
                                                152/209.23
(Continued)

FOREIGN PATENT DOCUMENTS

EP       1974955 A1   10/2008
EP       2623340    *  8/2013
(Continued)

OTHER PUBLICATIONS

English machine translation of JP06-080002. (Year: 1994).*
Extended European Search Report, dated Jan. 25, 2017, for European Application No. 16180490.1.

*Primary Examiner* — Robert C Dye
(74) *Attorney, Agent, or Firm* — Birch, Stewart, Kolasch & Birch LLP (57) ABSTRACT

A heavy duty tire comprises a tread portion provided with annular land zones divided by circumferentially extending main grooves. At least one of the land zones is provided with first recesses disposed at one edge of the first land zone, second recesses disposed at the other edge of the first land zone, sipes extending from the first recesses to the second recesses, and shallow grooves extending from non-recessed portions of one edge of the first land zone to non-recessed portions of the other edge. The depth of the shallow grooves is less than the depth of the sipes.

10 Claims, 4 Drawing Sheets

(51) Int. Cl.
*B60C 11/04* (2006.01)
*B60C 11/13* (2006.01)

(52) U.S. Cl.
CPC ............ *B60C 2011/0386* (2013.01); *B60C 2011/1213* (2013.01); *B60C 2011/133* (2013.01); *B60C 2011/1338* (2013.01); *B60C 2011/1361* (2013.01); *B60C 2200/06* (2013.01)

(56) References Cited

U.S. PATENT DOCUMENTS 6,003,575 A * 12/1999 Koyama ............ B60C 11/12
152/209.18
2011/0192513 A1 8/2011 Hamada

FOREIGN PATENT DOCUMENTS

| JP | 06-080002 | * | 3/1994 |
| JP | 2011-161988 A | | 8/2011 |

* cited by examiner

HEAVY DUTY TIRE

BACKGROUND OF THE INVENTION

The present invention relates to a heavy duty tire, more particularly to a tread pattern capable of improving uneven wear resistance without sacrificing wet performance.

In the Japanese Patent Application Publication No. 2011-161988 (hereinafter, Patent Document 1), a heavy duty tire is disclosed, wherein the tread portion is provided in a crown land zone and middle land zones with shallow grooves with sipes extending in the groove bottom surfaces in order to improve the wet performance and uneven wear resistance.

SUMMARY OF THE INVENTION

In the heavy duty tire disclosed in the Patent Document 1, there is a problem such that, when the tread portion is subjected to a lateral force in the tire axial direction during cornering for example, due to the insufficient rigidities of the crown land zone and the middle land zones, heel-and-toe wear is liable to occur at the ends of the shallow grooves. Thus, there is room for improvement in the uneven wear performance.

The present invention was made in view of the above circumstances, and a primary object of the present invention is to provide a heavy duty tire in which, by improving the arrangement of shallow grooves and sipes, the uneven wear resistance can be improved without sacrificing the wet performance.

According to the present invention, a heavy duty tire comprises a tread portion provided with a plurality of main grooves extending continuously in the tire circumferential direction and a plurality of land zones defined by the main grooves, the land zones include at least one first land zone defined as being provided with first recesses disposed at one of the edges of the first land zone, second recesses disposed at the other edge of the first land zone, sipes extending from the first recesses to the second recesses, and shallow grooves extending from non-recessed portions of one edge of the first land zone to non-recessed portions of the other edge, and the sipes have a depth and the shallow grooves have a depth less than the depth of the sipes.

The heavy duty tire according to the present invention may include the following features (1)-(9):

(1) the sipes intersect with the shallow grooves;
(2) the main grooves defining the first land zone has a depth, and the depth of the sipes is less than the depth of the main grooves;
(3) the land zones include a crown land zone on the tire equator, a pair of shoulder land zones as the axially outermost land zones, and a pair of middle land zones therebetween,
the crown land zone and the middle land zones are each formed as the above-mentioned first land zone, and
the shoulder land zones are each formed as a second land zone provided with neither sipes nor grooves;
(4) the sipes include crown sipes disposed in the crown land zone, and middle sipes disposed in the middle land zones,
with respect to the tire axial direction, the crown sipes are inclined to a first circumferential direction over their respective entire lengths, and
the middle sipes each comprise a pair of end portions which are inclined to the same direction as the crown sipes, and a middle portion between the end portions which is inclined to the opposite direction to the crown sipes;
(5) the shallow grooves include crown shallow grooves disposed in the crown land zone, and middle shallow grooves disposed in the middle land zones,
the crown shallow grooves each comprise a pair of end portions which are inclined to the same direction as the crown sipes, and a middle portion between the end portions which is inclined to the opposite direction to the crown sipes,
the middle shallow grooves are inclined to the same direction as the crown sipes over their respective entire lengths;
(6) between the crown land zone and each middle land zone, the end portions of the crown shallow grooves are linearly continuous to the respective end portions of the middle sipes across the main groove;
(7) the crown sipes each comprise a pair of end portions having an angle with respect to the tire axial direction, and a middle portion therebetween having an angle with respect to the tire axial direction which is larger than that of the end portions,
the middle shallow grooves each comprise a pair of end portion having an angle with respect to the tire axial direction, and a middle portion therebetween having an angle with respect to the tire axial direction which is larger than the angle of the end portions,
between the crown land zone and each middle land zone, the end portions of the crown sipes are linearly continuous to the respective end portions of the middle shallow grooves across the main groove;
(8) the middle portions of the crown sipes intersect with the respective middle portions of the crown shallow grooves, and
the middle portions of the middle sipes intersect with the respective middle portions of the middle shallow grooves;
(9) the pitches in the tire circumferential direction of the crown sipes are 1.05 to 1.33 times the maximum width in the tire axial direction of the crown land zone.

In the heavy duty tire according to the present invention, at least one of the land zones is the first land zone which defined as being provided with the first recesses disposed at one of the edges of the first land zone, the second recesses disposed at the other edge of the first land zone, and the sipes extending from the first recesses to the second recesses. Such first and second recesses each have a wall portion extending in the tire circumferential direction and wall portions extending in the tire axial direction, and thereby improve the rigidity of the first land zone in the vicinity of each sipe having the deeper depth. Therefore, even if the heavy duty tire is subjected to a lateral force in the tire axial direction, uneven wear of the land zone in the vicinity of each sipe is suppressed, and the uneven wear resistance of heavy duty tire can be improved.

In the heavy duty tire according to the present invention, the first land zone is provided with the shallow grooves extending from the non-recessed portions of one edge of the first land zone to the non-recessed portions of the other edge of the first land zone, and the shallow grooves have a depth less than the depth of the sipes. Such shallow grooves can suppress the decrease in the rigidity of the tread portion while maintaining the drainage. Therefore, the first land zone can suppress the occurrence of uneven wear at the ends of the shallow grooves, and it is possible to improve the uneven wear resistance. while maintaining the wet performance of the heavy duty tire.

As described above, the heavy duty tires according to the present invention can be improved in the uneven wear resistance, while maintaining the wet performance.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load capacity" in ETRTO, the maximum value given in the above-mentioned table in TRA or the like.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

DESCRIPTION OF THE PREFERRED EMBODIMENT

An embodiment of the present invention will now be described in detail in conjunction with accompanying drawings.

A heavy duty tire 1 as an embodiment of the present invention is a pneumatic tire for truck, bus and the like. In general, a pneumatic tire comprises a tread portion whose outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion as well known in the art.

Figure 1:
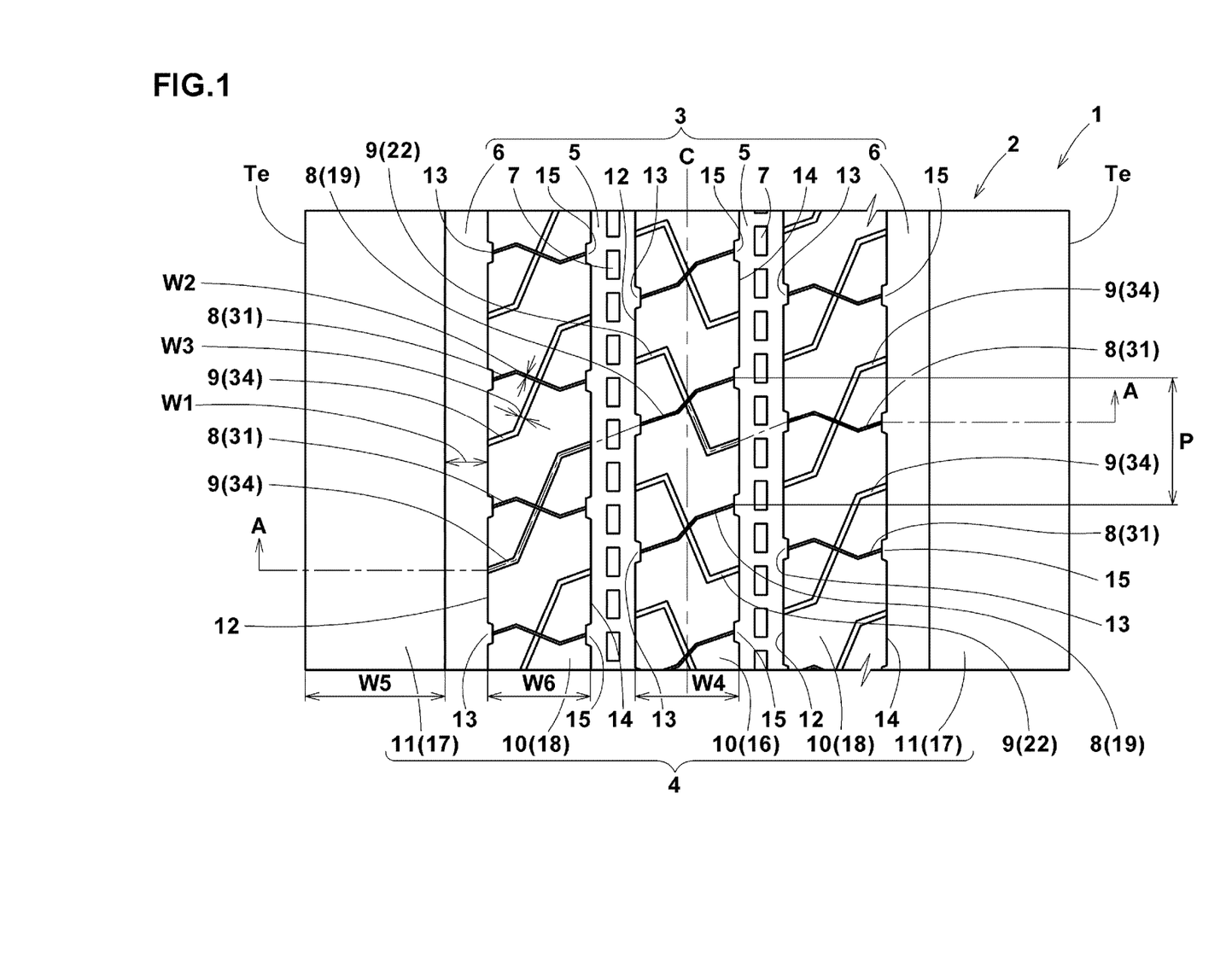
FIG. 1 is a developed view of a tread portion of a heavy duty tire as an embodiment of the present invention.

FIG. 1 shows the tread portion 2 of the heavy duty tire 1. The tread portion 2 is provided with a plurality of main grooves 3 extending continuously in the tire circumferential direction, and a plurality of land zones 4 which are axially divided by the main grooves 3.

The main grooves 3 in this embodiment comprise a pair of crown main grooves 5 disposed one on each side of the tire equator C, and a pair of shoulder main grooves 6 disposed one between each crown main groove 5 and the adjacent tread edge Te.

The crown main grooves 5 in this example extend straight in the tire circumferential direction.

Preferably, the crown main grooves 5 are each provided in the groove bottom with a plurality of platforms 7.

The platforms 7 protrude radially outwardly from the groove bottom and are arranged at intervals in the tire circumferential direction. Each of the platforms 7 in this example has a substantially rectangular top shape. The platforms 7 can prevent small objects such as stones from being entrapped in the crown main groove 5.

The shoulder main grooves 6 in this example extend straight in the tire circumferential direction.

The shoulder main grooves 6 may be provided with the platforms 7 in the same manner as the crown main grooves 5, but in this example, the platforms 7 are not provided.

Figure 2:
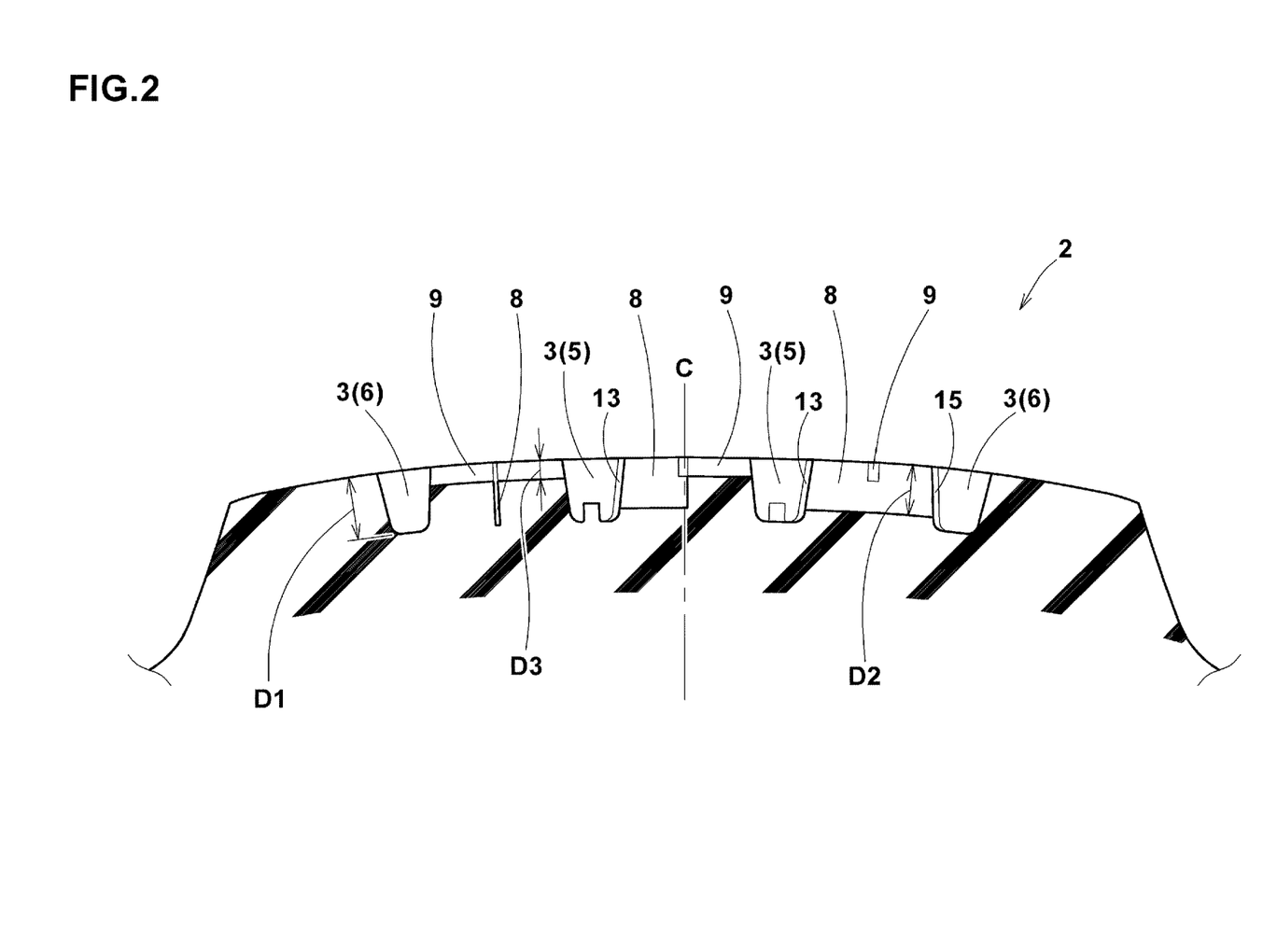
FIG. 2 is a cross-sectional view of the tread portion taken along line A-A in FIG. 1.

As shown in FIG. 2, the groove depth D1 of each of the main grooves 3 inclusive of the crown main grooves 5 and the shoulder main grooves 6 is preferably set in a range of from 12 mm to 20 mm.

It is possible that the main grooves 3 have different groove depths D1, but, in this embodiment, the main grooves 3 have the same groove depth D1.

If the groove depth D1 is less than 12 mm, there is a possibility that the groove volume of the main groove 3 become insufficient, and the wet performance is deteriorated. If the groove depth D1 is more than 20 mm, there is a possibility that the land zone 4 is decreased in the rigidity, and the uneven wear resistance and steering stability are deteriorated.

As shown in FIG. 1, the groove width W1 of each of the main grooves 3 is preferably set in a range of from 10 mm to 18 mm.

It is possible that the main grooves 3 have different groove widths W1, but, in this embodiment, the main grooves 3 have the same groove width W1.

If the groove width W1 is less than 10 mm, there is a possibility that the groove volume of the main groove 3 becomes insufficient, and the wet performance is deteriorated. If the groove width W1 is more than 18 mm, there is a possibility that the land zone 4 is decreased in the rigidity, and the uneven wear resistance and steering stability performance are deteriorated.

In this embodiment, the land zones 4 include at least one first land zone 10 defined as being provided with a plurality of sipes 8 and a plurality of shallow grooves 9, and at least one second land zone 11 defined as being provided with neither sipes nor grooves.

It is preferable that the side edges 12 and 14 of the first land zone 10 are periodically recessed such that the side edge 12 is provided with a plurality of first recesses 13, and the side edge 14 is provided with a plurality of second recesses 15. The first and second recesses 13 and 15 dent toward the widthwise center of the first land zone 10.

In this embodiment, as shown in FIG. 2, the depth of the first recess 13 is the substantially same as the groove depth D1 of the adjacent main groove 3, and the depth of the second recess 15 is the substantially same as the groove depth D1 of the adjacent main groove 3.

The depth of the first/second recess 13/15 may be less than the groove depth D1 of the adjacent main groove 3, but it is preferably more than the after-mentioned depth D2 of the sipes 8.

In this embodiment, the above-mentioned sipes 8 extend from the respective first recesses 13 to the respective second recesses 15 as shown in FIG. 1, therefore, the ends of the sipes 8 are opened at the respective recesses 13 and 15.

On the other hand, the shallow grooves 9 extend from non-recessed portions of the side edge 12 (other than the first recesses 13) to non-recessed portions of the side edge 14 (other than the second recesses 15), therefore, the ends of the shallow grooves 9 are opened at the respective non-recessed portions.

It is preferable that, in the first land zone 10, the sipes 8 intersect with the shallow grooves 9 respectively as shown.

Such sipes 8 and shallow grooves 9 can prevent uneven wear due to uneven rigidity of the first land zone 10 when the first land zone 10 is subjected to a large lateral force in the tire axial direction.

As shown in FIG. 2, the depth D2 of the sipe 8 is preferably less than the groove depth D1 of the adjacent main groove 3. The depth D2 of the sipe 8 is preferably not more than 80% of the groove depth D1 of the main groove 3.

If the depth D2 is more than 80% of the groove depth D1, then, in initial stage of the tread wear life, heel and toe wear is liable to occurs, and the uneven wear resistance is deteriorated.

It is desirable that the groove depth D3 of the shallow grooves 9 is less than the depth D2 of the sipes 8.

Preferably, the groove depth D3 of the shallow grooves 9 is not more than 30% of the groove depth D1 of the main groove 3. If the groove depth D3 is more than 30% of the groove depth D1, there is a possibility that the rigidity of the first land zone 10 becomes insufficient, and the uneven wear resistance is deteriorated.

As shown in FIG. 1, the width W2 of the sipe 8 is preferably 1.5 mm or less.

If the width W2 of the sipe 8 is more than 1.5 mm, the effect of mutually supporting the portions of the first land zone 10 adjacent to the sipes 8 is reduced, and there is a possibility that the uneven wear resistance is deteriorated.

The groove width W3 of the shallow groove 9 is preferably set in a range of from 1.0 m to 3.0 mm.

If the groove width W3 is less than 1.0 mm, the shallow groove 9 becomes insufficient in its drainage, and there is a possibility that the wet performance is deteriorated. If the groove width W3 is more than 3.0 mm, there is a possibility that the rigidity of the first land zone 10 becomes insufficient, and the uneven wear resistance is deteriorated.

In this embodiment, the land zones 4 are a crown land zone 16 positioned on the tire equator C, a pair of axially outermost shoulder land zones 17 extending along the tread edges Te, and a pair of middle land zones 18 between the crown land zone 16 and the shoulder land zones 17.

The maximum width W4 in the tire axial direction of the crown land zone 16 is defined between the crown main grooves 5. The maximum width W5 in the tire axial direction of the shoulder land zone 17 is defined between the shoulder main groove 6 and the tread edge Te. Preferably, the maximum width W5 of the shoulder land zone 17 is set in a range of from 125% to 150% of the maximum width W4 of the crown land zone 16.

As the ground contact area of such shoulder land zone 17 is larger, the shoulder land zone 17 can be improved in the uneven wear resistance and wear resistance during cornering where it is subjected to a large load.

The maximum width W6 in the tire axial direction of the middle land zone 18 is defined between the crown main groove 5 and the shoulder main groove 6. Preferably, the maximum width W6 of the middle land zone 18 is set in a range of from 98% to 110% of the maximum width W4 of the crown land zone 16.

The maximum width W6 of the middle land zone 18 may be equal to the maximum width W4 of the crown land zone 16.

By adjusting the ratio of the maximum width W6 of the middle land zone 18 to the maximum width W4 of the crown land zone 16, it is possible to achieve both of the wet performance and the uneven wear resistance.

It is preferable that the crown land zone 16 and the middle land zones 18 are each configured as the above-mentioned first land zone 10, and the shoulder land zones 17 are each configured as the above-mentioned second land zone 11.

Such shoulder land zone 17 has a larger effective ground contact area, and can be improved in the uneven wear resistance and wear resistance.

In this embodiment, each of the crown sipes 19 is inclined with respect to the tire axial direction to a first circumferential direction over its entire length.

Figure 3:
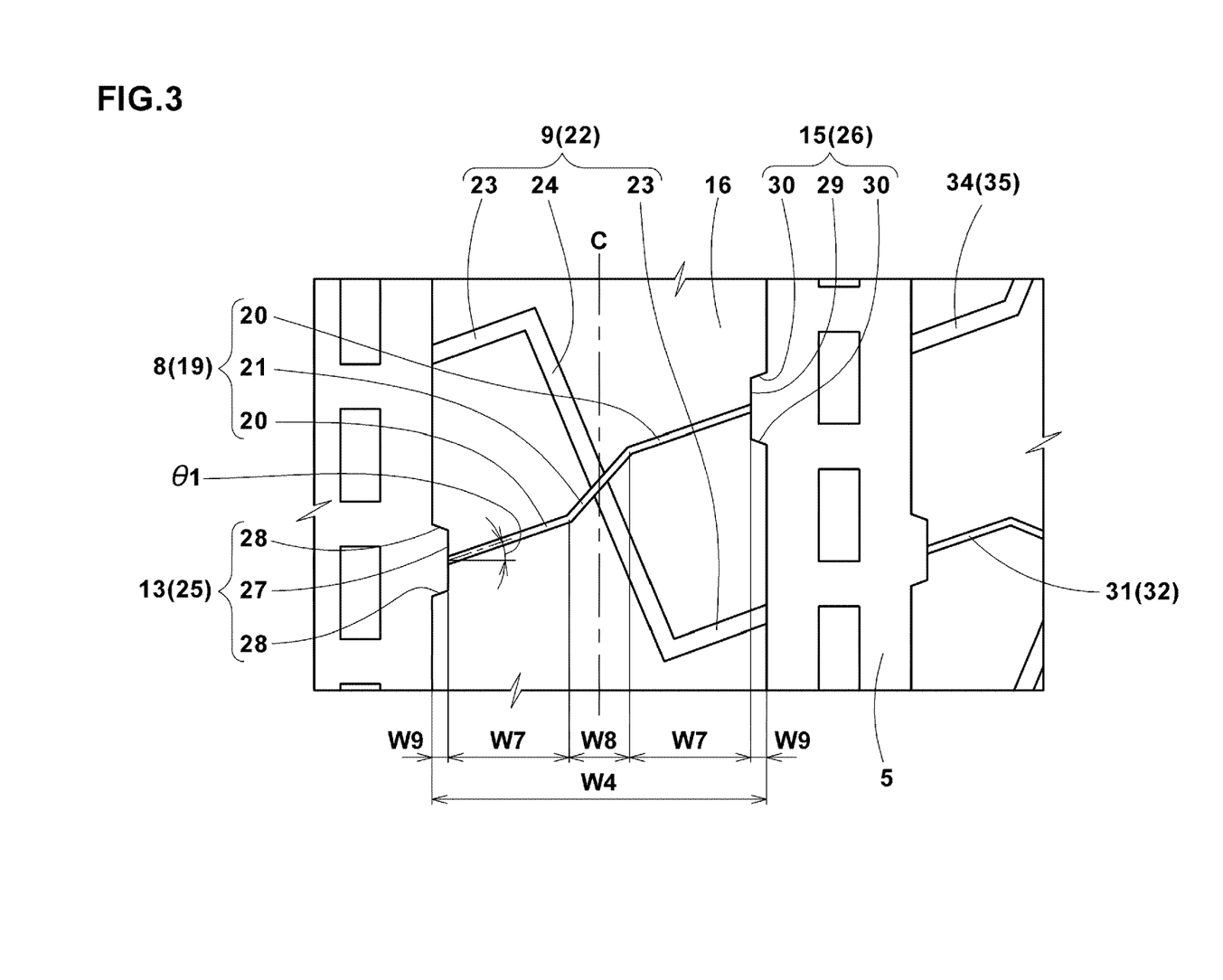
FIG. 3 is an enlarged partial top view of a crown land zone in FIG. 1.

As shown in FIG. 3, the crown sipe 19 in this example is composed of a pair of end portions 20 and a middle portion 21 therebetween.

The end portions 20 and the middle portion 21 are inclined with respect to the tire axial direction to the first circumferential direction, and
the inclination angle of the middle portion 21 is greater than the inclination angle of the end portions 20.

Preferably, the inclination angle $\theta 1$ of the end portions 20 is set in a range of from 10 to 30 degrees with respect to the tire axial direction.

Preferably, the axial dimension W8 of the middle portion 21 is set in a range of from 40% to 60% of the axial dimension W7 of each end portion 20.

Such crown sipes 19 can prevent the crown land zone 16 from being largely deformed when the crown land zone 16 is subjected to a lateral force in the tire axial direction during cornering. Thus, the uneven wear resistance can be improved.

In this embodiment, the shallow grooves 9 include crown shallow grooves 22 disposed in the crown land zone 16.

As shown in FIG. 3, each of the crown shallow grooves 22 in this example is composed of a pair of end portions 23 and an middle portion 24 therebetween.

The end portions 23 are inclined with respect to the tire axial direction to the same direction as the crown sipes 19, and the middle portion 24 is inclined with respect to the tire axial direction to the opposite direction to the crown sipes 19. The crown shallow groove 22 has a zigzag shape.

In such crown shallow groove 22, both of the drainage and the rigidity of the crown land zone 16 can be achieved, and the uneven wear resistance can be improved while maintaining the wet performance.

In the crown land zone 16 in this embodiment, the middle portions 21 of the crown sipes 19 respectively intersect the middle portions 24 of the crown shallow grooves 22 substantially at the tire equator c.

It is possible to effectively suppress uneven wear of the crown land zone 16, due to uneven rigidity of the crown land zone 16, when the crown land zone 16 is subjected to a large lateral force in the tire axial direction since the intersecting angle between the crown sipes 19 and the crown shallow grooves 22 is relatively large.

In this embodiment, the first recesses 13 include crown first recesses 25 disposed in the crown land zone 16, and the second recesses 15 include crown second recesses 26 disposed in the crown land zone 16.

Thus, the crown sipes 19 extend from the crown first recesses 25 to the crown second recesses 26 so as to open at the respective recesses 25 and 26.

The crown first recess 25 has a pair of wall portions 28 extending in the tire axial direction, and a wall portion 27 therebetween extending in the tire circumferential direction. The crown second recess 26 has a pair of wall portions 30 extending in the tire axial direction, and a wall portion 29 therebetween extending in the tire circumferential direction. Such crown first recess 25 and the crown second recess 26 can improve the rigidity of the portions of the crown land zone 16 adjacent the crown sipes 19, therefore, it is possible to reduce the uneven wear of the crown land zone 16 when the crown land zone 16 is subjected to a lateral force in the tire axial direction.

As shown in FIG. 3, the axial dimension W9 of each of the crown first recesses 25 and the crown second recesses 26 is preferably set in a range of from 3% to 10% of the maximum width W4 of the crown land zone 16.

In this embodiment, the axial dimension W9 of the crown first recesses 25 is the same as the axial dimension W9 of the crown second recesses 26, but the axial dimensions W9 may be different from one another.

If the axial dimension W9 is less than 3% of the maximum width W4, there is a possibility that the rigidity of the portions of the crown land zone 16 adjacent to the crown sipes 19 can not be effectively improved. If the axial dimension W9 is more than 10% of the maximum width W4, the rigidity of the crown land zone 16 becomes insufficient, and uneven wear such as heel-and-toe wear is liable to occur.

As shown in FIG. 1, the pitches P in the tire circumferential direction of the crown sipes 19 are preferably set in a range of from 1.05 to 1.33 times the maximum width W4 in the tire axial direction of the crown land zone 16.

As a results, the rigidity of the crown land zone 16 can be maintained in a proper range.

In this embodiment, the sipes 8 include middle sipes 31 disposed in the middle land zones 18.

Figure 4:
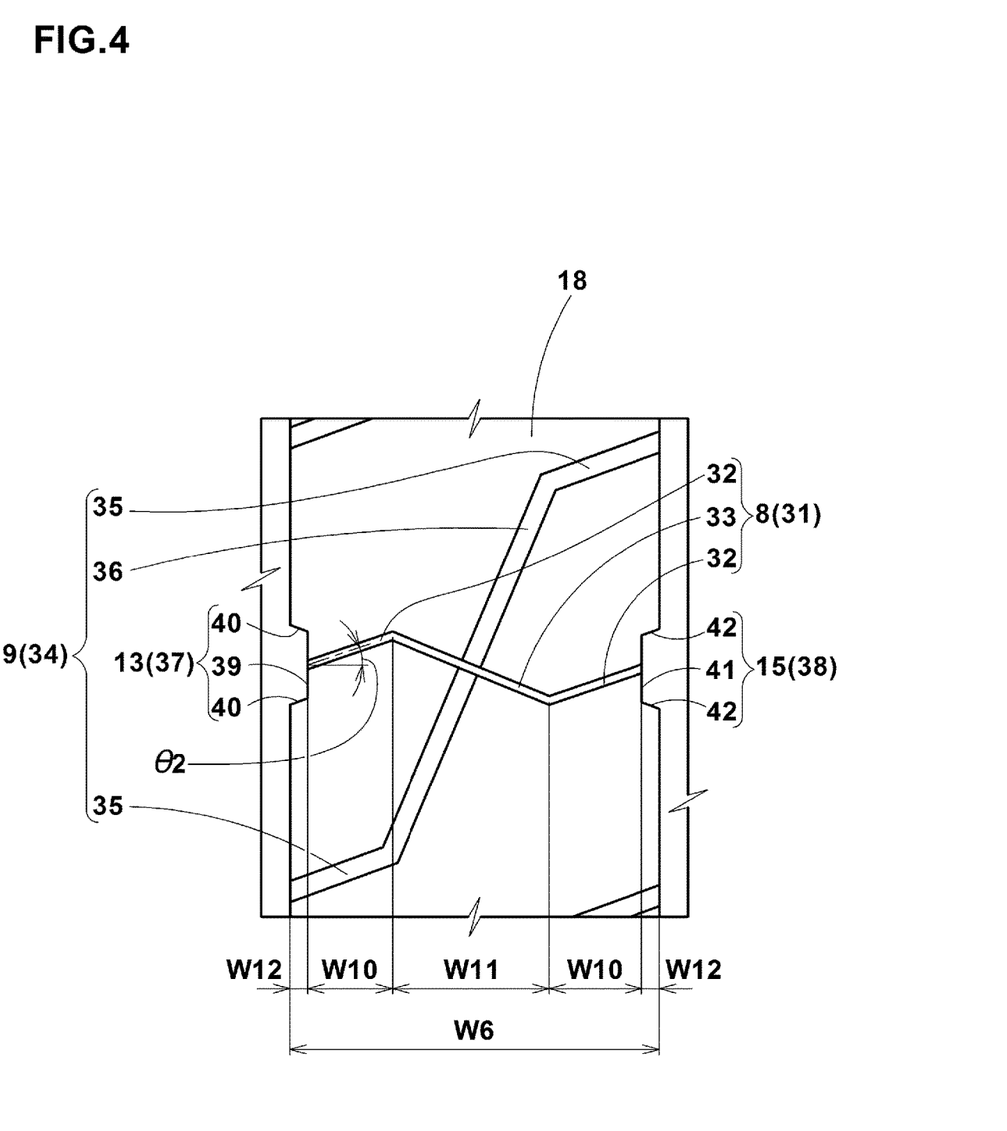
FIG. 4 is an enlarged partial top view of a middle land zone in FIG. 1.

Each of the middle sipes 31 is, as shown in FIG. 4, composed of a pair of end portions 32 and an middle portion 33 therebetween. The end portions 32 are inclined with respect to the tire axial direction to the same direction as the crown sipes 19, and the middle portion 33 is inclined with respect to the tire axial direction to the opposite direction to the crown sipes 19.

The angle θ2 of the end portions 32 of each of the middle sipes 31 with respect to the tire axial direction is preferably set in a range of from 10 to 30 degrees.

The axial dimension W11 of the middle portion 33 of each of the middle sipes 31 is preferably set in a range of from 160% to 200% of the axial dimension W10 of the end portions 32 of middle sipe 31. The middle sipe 31 has a zigzag shape.

Such middle sipes 31 can reduce deformation of the middle land zone 18 when the middle land zone 18 is subjected to a lateral force in the tire axial direction during cornering, and the uneven wear resistance can be improved.

In this embodiment, the shallow grooves 9 include middle shallow grooves 34 disposed in the middle land zones 18.

It is preferable that the middle shallow grooves 34 are inclined with respect to the tire axial direction to the same direction as the crown sipes 19 over their respective entire lengths.

In this example, as shown in FIG. 1, the middle shallow groove 34 comprises a pair of end portions 35 and a middle portion 36 therebetween. The end portions 35 are inclined at an angle with respect to the tire axial direction, and the middle portion 36 is inclined at an angle with respect to the tire axial direction which angle is greater than that of the end portions 35.

Such middle shallow groove 34 can achieve both of the drainage and the rigidity of the middle land zone 18, and the uneven wear resistance can be improved while maintaining the wet performance.

In each of the middle land zones 18 in this embodiment, the middle portions 33 of the middle sipes 31 respectively intersect with the middle portions 36 of the middle shallow grooves 34.

It is possible to more effectively prevent the uneven wear of the middle land zone 18, due to uneven rigidity of the middle land zone 18, when the middle land zone 18 is subjected to a large lateral force in the tire axial direction since the intersecting angle between the middle sipes 31 and the middle shallow grooves 34 are relatively large.

In this embodiment, the above-mentioned first recesses 13 include middle first recesses 37 disposed in the middle land zones 18, and the second recesses 15 include middle second recesses 38 disposed in the middle land zone 18.

Therefore, in this embodiment, the middle sipes 31 extend from the respective middle first recesses 37 to the respective middle second recesses 38 so that the ends are opened at the respective recesses 37 and 38.

In this embodiment, as shown in FIG. 4, each of the middle first recesses 37 has a pair of wall portions 40 extending in the tire axial direction, and a wall portion 39 therebetween extending in the tire circumferential direction. Each of the middle second recesses 38 has a pair of wall portions 42 extending in the tire axial direction, and a wall portion 41 therebetween extending in the tire circumferential direction.

Such middle first recesses 37 and the middle second recesses 38 can improve the rigidity of portions of the middle land zone 18 adjacent to the middle sipes 31, therefore, uneven wear of the portions of the middle land zone 18 adjacent to the middle sipes 31 when the middle land zone 18 is subjected to a lateral force in the tire axial direction can be reduced.

Preferably, the middle first recesses 37 and the middle second recesses 38 each have an axial dimension W12 in a range of from 3% to 10% of the maximum axial width W6 of the middle land zone 18.

The axial dimension W12 of the middle first recesses 37 may be different from the axial dimension W12 of the middle second recesses 38. But, in this embodiment, the middle first recesses 37 and the middle second recesses 38 have the same axial dimension W12.

If the axial dimensions W12 of the first recess 37 and the middle second recess 38 are less than 3% of the maximum width W6 of the middle land zone 18, there is a possibility that the rigidity of the middle land zone 18 is not so improved in the portions adjacent to the middle sipes 31. If the axial dimensions W12 of the first recess 37 and the middle second recess 38 are more than 10% of the maximum width W6 of the middle land zone 18, there is a possibility that the rigidity of the middle land zone 18 is decreased, and uneven wear such as heel-and-toe wear is liable to occur.

As shown in FIG. 1, the pitches, in the tire circumferential direction, of the middle sipes 31 are preferably the same as the pitches P, in the tire circumferential direction, of the crown sipes 19. Such middle sipes 31 can maintain the rigidity of the middle land zone 18 in a proper range.

It is preferable that, on both sides of the each of the crown main grooves 5, the end portions 35 of the middle shallow grooves 34 are aligned with the end portions 20 of the crown sipes 19 so that, as shown in FIG. 3, the end portions 20 are linearly continued to the respective end portions 35 through the crown main grooves 5.

Further, it is preferable that, on both sides of the each of the crown main grooves 5, the end portions 23 of the crown shallow grooves 22 are aligned with the end portions 32 of the middle sipes 31 so that, as shown in FIG. 3, the end portions 23 are linearly continued to the respective end portions 32. Therefore, the crown land zone 16 and the middle land zones 18 as a whole can be prevented from wearing unevenly due to the uneven rigidity.

While detailed description has been made of an especially preferable embodiment of the present invention, the present invention can be embodied in various forms without being limited to the illustrated embodiment Comparison Tests Heavy duty tires of size 12R22.5 were experimentally manufactured and tested for the wet performance, uneven wear resistance and wear resistance, wherein
Working example had the tread pattern shown in FIG. 1, and Comparative example had the tread pattern shown in FIG. 6 of the Patent Document 1.

<Wet Performance>

The test tires were mounted on the steered wheels of a truck (tire pressure 930 kPa), and the braking distance of the truck when its brakes were fully applied during traveling at a speed of 80 km/h on a wet pavement surface was measured. The results are indicated in Table 1 by an index based on Comparative Example being 100, wherein the smaller the value, the better the wet performance.

<Uneven Wear Resistance and Wear Resistance>

The test tires were mounted on the steered wheels of a truck (tire pressure 930 kPa), and, after traveling for a predetermined distance on a predetermined route, the amount of wear was measured at plural measuring points.

The uneven wear resistance was evaluated by the variations of the amounts of wear, and the wear resistance was evaluated by the average of the amounts of wear.

The results are indicated in Table 1 by an index based on comparative Example being 100, wherein the smaller the value, the better the performance.

TABLE 1

| Tire | Comparative Example | Working Example |
|---|---|---|
| wet performance | 100 | 100 |
| uneven wear resistance | 100 | 95 |
| wear resistance | 100 | 92 |

As shown in Table 1, it was confirmed that, as compared to comparative example, working Example was improved in the uneven wear resistance and the wear resistance, while maintaining the wet performance.

DESCRIPTION OF THE SYMBOLS 2 tread portion
3 main groove
4 land zone
8 sipe
9 shallow groove
10 first land zone
13 first recess
15 second recess

The invention claimed is:

1. A heavy duty tire comprising:
a tread portion provided with a plurality of main grooves extending continuously in the tire circumferential direction and a plurality of annular land zones defined by the main grooves, wherein
the land zones include at least one first land zone which is defined as being provided with
first recesses disposed at one of the edges of the first land zone,
second recesses disposed at the other edge of the first land zone,
sipes extending from the first recesses to the second recesses, and
shallow grooves extending from non-recessed portions of one edge of the first land zone to non-recessed portions of the other edge,
the sipes have a depth and the shallow grooves have a depth less than the depth of the sipes,
each of the sipes is made up of a pair of parallel straight end portions and a straight middle portion therebetween so as to have a zigzag shape,
each of the shallow grooves is made up of a pair of parallel straight end portions and a straight middle portion therebetween so as to have a zigzag shape,
in each first land zone, the middle portion of each of the shallow grooves intersects with the middle portion of one of the sipes,
the land zones include a crown land zone on the tire equator, a pair of axially outermost shoulder land zones, and a pair of middle land zones between the crown land zone and the shoulder land zones,
the crown land zone and the middle land zones are each formed as the first land zone, and
the parallel straight end portions of the sipes and the parallel straight end portions of the shallow grooves in the crown land zone and the middle land zones are inclined to one direction with respect to the tire axial direction.

2. The heavy duty tire according to claim 1, wherein the main grooves defining the at least one first land zone have a depth, and the depth of the sipes in the at least one first land zone is less than the depth of the main grooves.

3. A heavy duty tire comprising:
a tread portion provided with a plurality of main grooves extending continuously in the tire circumferential direction and a plurality of annular land zones defined by the main grooves, wherein
the land zones include at least one first land zone which is defined as being provided with
first recesses disposed at one of the edges of the first land zone,
second recesses disposed at the other edge of the first land zone,
sipes extending from the first recesses to the second recesses, and
shallow grooves extending from non-recessed portions of one edge of the first land zone to non-recessed portions of the other edge, and
the sipes have a depth and the shallow grooves have a depth less than the depth of the sipes, the land zones include a crown land zone on the tire equator, a pair of axially outermost shoulder land zones, and a pair of middle land zones between the crown land zone and the shoulder land zones, the crown land zone and the middle land zones are each formed as the first land zone, and the shoulder land zones are each formed as a second land zone provided with neither sipes nor grooves.

4. The heavy duty tire according to claim 3, wherein the sipes include crown sipes disposed in the crown land zone and middle sipes disposed in the middle land zones, the crown sipes are inclined with respect to the tire axial direction to a first circumferential direction over their respective entire lengths, and the middle sipes each comprise a pair of end portions which are inclined to the same direction as the crown sipes, and a middle portion between the end portions which is inclined to the opposite direction to the crown sipes.

5. The heavy duty tire according to claim 4, wherein pitches of the crown sipes in the tire circumferential direction are 1.05 to 1.33 times the maximum width in the tire axial direction of the crown land zone.

6. The heavy duty tire according to claim 4, wherein the shallow grooves include crown shallow grooves disposed in the crown land zone and middle shallow grooves disposed in the middle land zones, the crown shallow grooves each comprise a pair of end portions which are inclined to the same direction as the crown sipes, and a middle portion between the end portions which is inclined to the opposite direction to the crown sipes, and the middle shallow grooves are inclined to the same direction as the crown sipes over their respective entire lengths.

7. The heavy duty tire according to claim 6, wherein between the crown land zone and each middle land zone, the end portions of the crown shallow grooves are linearly continuous to the respective end portions of the middle sipes across the main groove.

8. The heavy duty tire according to claim 6, wherein the crown sipes each comprise a pair of end portions having an angle with respect to the tire axial direction, and a middle portion therebetween having an angle with respect to the tire axial direction which angle is larger than that of the end portions, the middle shallow grooves each comprise a pair of end portions having an angle with respect to the tire axial direction, and a middle portion therebetween having an angle with respect to the tire axial direction which is larger than the angle of the end portions, and between the crown land zone and each middle land zone, the end portions of the crown sipes are linearly continuous to the respective end portions of the middle shallow grooves across the main groove.

9. The heavy duty tire according to claim 8, wherein the middle portions of the crown sipes intersect with the respective middle portions of the crown shallow grooves, and the middle portions of the middle sipes intersect with the respective middle portions of the middle shallow grooves.

10. A heavy duty tire comprising:

a tread portion provided with a plurality of main grooves extending continuously in the tire circumferential direction and a plurality of annular land zones defined by the main grooves, wherein the land zones include at least one first land zone which is defined as being provided with first recesses disposed at one of the edges of the first land zone, second recesses disposed at the other edge of the first land zone, sipes extending from the first recesses to the second recesses, and shallow grooves extending from non-recessed portions of one edge of the first land zone to non-recessed portions of the other edge, the sipes have a depth and the shallow grooves have a depth less than the depth of the sipes, each of the sipes is made up of a pair of parallel straight end portions and a straight middle portion therebetween so as to have a zigzag shape, each of the shallow grooves is made up of a pair of parallel straight end portions and a straight middle portion therebetween so as to have a zigzag shape, in each first land zone, the middle portion of each of the shallow grooves intersects with the middle portion of one of the sipes, in each first land zone, the parallel straight end portions of the sipes and the parallel straight end portions of the shallow grooves are inclined in one direction, the land zones include a crown land zone on the tire equator, a pair of axially outermost shoulder land zones, and a pair of middle land zones between the crown land zone and the shoulder land zones, and the crown land zone and the middle land zones are each formed as the first land zone.

* * * * *